United States Patent
Astrom et al.

(10) Patent No.: US 11,044,779 B2
(45) Date of Patent: Jun. 22, 2021

(54) NETWORK NODE, A FIRST COMMUNICATIONS DEVICE AND METHODS THEREIN FOR MONITORING OF AN INFORMATION SIGNAL IN MONITORING TIME PERIODS OF DIFFERENT TIME DURATIONS

(71) Applicant: Telefonaktiebolaget LM Ericsson (publ), Stockholm (SE)

(72) Inventors: Magnus Astrom, Lund (SE); Peter Alriksson, Horby (SE); Andres Reial, Malmo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 87 days.

(21) Appl. No.: 15/672,545

(22) Filed: Aug. 9, 2017

(65) Prior Publication Data
US 2018/0295654 A1 Oct. 11, 2018

(30) Foreign Application Priority Data
Apr. 7, 2017 (EP) .................................. 17165421

(51) Int. Cl.
*H04W 52/02* (2009.01)
*H04W 76/28* (2018.01)
(Continued)

(52) U.S. Cl.
CPC ....... *H04W 76/28* (2018.02); *H04W 52/0216* (2013.01); *H04W 52/0229* (2013.01);
(Continued)

(58) Field of Classification Search
CPC .. H04W 76/28; H04W 52/0216; H04W 76/38
See application file for complete search history.

(56) References Cited

U.S. PATENT DOCUMENTS

| | | | |
|---|---|---|---|
| 9,144,016 B2 | 9/2015 | Frenger et al. | |
| 2012/0014306 A1* | 1/2012 | Pelletier | H04W 52/0216 370/311 |

(Continued)

FOREIGN PATENT DOCUMENTS

| | | |
|---|---|---|
| CN | 105052114 A | 11/2015 |
| EP | 2721879 A1 | 4/2014 |

(Continued)

OTHER PUBLICATIONS

PCT International Search Report, dated May 25, 2018, in connection with International Application No. PCT/EP2018/058485, all pages.
(Continued)

*Primary Examiner* — Romani Ohri
(74) *Attorney, Agent, or Firm* — Leffler Intellectual Property Law, PLLC

(57) ABSTRACT

A network node and a method therein for configuring a first communications device to monitor reception of an information signal in monitoring time periods of different time durations. One monitoring time period being relatively shorter than another, longer monitoring time period. The information signal is repeatedly transmitted by a Radio Network Node (RNN) with a first periodicity during the longer monitoring time period and with a second periodicity during the shorter monitoring time period, the first periodicity being longer than the second periodicity. The network node determines that the first communications device is to be configured for monitoring reception of the information signal within one or more shorter monitoring time periods. Further, the network node configures the first communications device with a Discontinuous Reception cycle indicating a monitoring time point falling within the one or more shorter monitoring time periods.

17 Claims, 5 Drawing Sheets

(51) Int. Cl.
  *H04W 68/02* (2009.01)
  *H04W 76/38* (2018.01)
  *H04W 72/04* (2009.01)

(52) U.S. Cl.
  CPC .......... *H04W 68/02* (2013.01); *H04W 76/38* (2018.02); *H04W 72/042* (2013.01); *Y02D 30/70* (2020.08)

(56) References Cited

U.S. PATENT DOCUMENTS

| | | | | |
|---|---|---|---|---|
| 2013/0294313 A1* | 11/2013 | Han | | H04W 52/0216 |
| | | | | 370/311 |
| 2014/0325078 A1 | 10/2014 | Shan et al. | | |
| 2015/0009898 A1* | 1/2015 | Rosa | | H04L 5/0048 |
| | | | | 370/328 |
| 2015/0327325 A1* | 11/2015 | Koivisto | | H04L 5/005 |
| | | | | 370/350 |
| 2016/0212642 A1* | 7/2016 | Ljung | | H04W 76/28 |
| 2018/0035372 A1* | 2/2018 | Pradas | | H04W 76/28 |
| 2018/0146430 A1* | 5/2018 | Yadav | | H04W 52/0254 |

FOREIGN PATENT DOCUMENTS

| | | |
|---|---|---|
| WO | 2012173545 A1 | 12/2012 |
| WO | 2016099358 A1 | 6/2016 |
| WO | 2016182498 A1 | 11/2016 |

OTHER PUBLICATIONS

PCT Written Opinion, dated May 25, 2018, in connection with International Application No. PCT/EP2018/058485, all pages.
European Communication dated Oct. 19, 2017, with European Search Report, in connection with EP Application No. 17165421.3, 9 pages.
Indian Office Action dated Feb. 13, 2020 in connection with Indian Application No. 201714027854, 5 pages.
European Communication dated Dec. 7, 2020 in connection with European Application No. 17165421.3, 9 pages.

* cited by examiner

NETWORK NODE, A FIRST COMMUNICATIONS DEVICE AND METHODS THEREIN FOR MONITORING OF AN INFORMATION SIGNAL IN MONITORING TIME PERIODS OF DIFFERENT TIME DURATIONS

CROSS-REFERENCE TO RELATED APPLICATIONS

This application claims priority under 35 U.S.C. § 119 of European Patent Application No. EP17165421.3, filed on Apr. 7, 2017, which application is hereby incorporated herein by reference in its entirety.

TECHNICAL FIELD

Embodiments herein relate to a network node, a first communications device and to methods therein. Especially, embodiments herein relate to the monitoring of an information signal in monitoring time periods of different time durations, wherein one monitoring time period being relatively shorter than another, longer monitoring time period, and wherein the information signal is repeatedly transmitted by a Radio Network Node (RNN) with a first periodicity during the longer monitoring time period and with a second periodicity during the shorter monitoring time period, the first periodicity being longer than the second periodicity.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a Third Generation (3G) telecommunication network, which evolved from the Second Generation (2G) Global System for Mobile Communications (GSM). The UMTS terrestrial radio access network (UTRAN) is essentially a RAN using Wideband Code Division Multiple Access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface, In the 3GPP LTE, base stations, which may be referred to as eNodeBs or even eNBs, may be directly connected to one or more core networks.

The 3GPP LTE radio access standard has been written in order to support high bitrates and low latency both for uplink and downlink traffic. All data transmission is in LTE controlled by the radio base station.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

The development of the 5G communications networks is driven partly by the Internet of Things (IoT) revolution where some estimates state that 500 billion communications devices will be connected in the future. A fraction of these communications devices will be deployed in situations or environments where changing the battery will be impossible. Hence, some of the communications devices are also expected to have a longevity of up to 10 years while only connecting hourly or daily to the communications network.

One main design principle of the 5G communications networks is the concept of lean network design. Hence, the communications network should only spend a minimal amount of energy transmitting broadcast information such as, e.g., synchronization signals. If traffic allows, a RNN, e.g. an eNB, should spend the remainder of the time in a low power sleep state, thereby preserving energy. One consequence of lean design is that synchronization signals will appear less often. A synchronization signal transmission period of 100 ms has been proposed as a value that enables high eNB energy efficiency. However, the synchronization signal transmission period may be shorter than 100 ms, e.g. 10 ms or 20 ms.

In addition to network energy consumption, the lean design may be motivated by reduced interference to other communications devices providing always on transmissions. In certain deployments there might be regulatory requirements limiting the amount of always on transmissions, e.g. maximum medium occupancy restrictions in unlicensed spectrum.

For a long-life and low-cost communications device to be able to access the communications network as infrequently as expected, it is likely that it will need to perform initial synchronization at each wake-up occasion. This may be a relatively expensive process considering that the synchronization signals will only be transmitted every 100 ms and since the process will involve correlating data over an observation window of at least 100 ms. Furthermore, some communications devices may need to utilize multiple reception occasions to rise above the noise floor, due to poor reception conditions, a reduced-performance receiver design, or due to an extended range support. U.S. Pat. No. 9,144,016 addresses how to set up synchronization signals to ease the burden of a communications device, e.g. an IoT device, by implementing dual synchronization periods. In a first time period, or time interval, P1, the synchronization signal is transmitted less frequently, whereas in a second time period, or time interval, P2, the synchronization signal is transmitted more frequently. In other words, the synchronization signal is transmitted with a longer periodicity in the first time period P1 and with a shorter periodicity in the second time period P2. A drawback with this solution is that it only enables a small number of communications devices to utilize the second time period P2.

SUMMARY

An aim of some embodiments disclosed herein is to overcome or mitigate at least some of the drawbacks with the prior art.

For example, the second time period P2 described in U.S. Pat. No. 9,144,016 is preconfigured and therefore only a small number of communications devices are enabled to utilize the second time period P2. Further, the prior art is associated with uneven load balancing and does not consider allocating communications devices appropriately to the two time periods P1, P2 such that the communications devices are evenly distributed between the two time periods P1, P2 and possibly also evenly distributed within each time period P1, P2. Further, the prior art does not consider adapting the configuration of the 30 time periods P1, P2 in order to fit sufficiently many communications devices into the shorter second time period P2 with more frequent transmissions of the synchronization signal, should there be a need for such an adaptation.

Hence, there is a need for an improved management of communications device in deployments enabling transmissions of information signals, e.g. synchronization signals, at variable periodicity.

According to an aspect of embodiments herein, the object is achieved by a method performed by a network node for configuring a first communications device to monitor reception of an information signal in monitoring time periods of different time durations, one monitoring time period being relatively shorter than another, longer monitoring time period. The information signal is repeatedly transmitted by a Radio Network Node (RNN) with a first periodicity during the longer monitoring time period and with a second periodicity during the shorter monitoring time period, the first periodicity being longer than the second periodicity. The first communications device and the RNN operate in a wireless communications network.

The network node determines that the first communications device is to be configured for monitoring reception of the information signal within one or more shorter monitoring time periods.

Further, the network node configures the first communications device with a Discontinuous Reception (DRX) cycle indicating a monitoring time point falling within the one or more shorter monitoring time periods.

According to another aspect of embodiments herein, the object is achieved by a network node for configuring a first communications device to monitor reception of an information signal in monitoring time periods of different time durations, one monitoring time period being relatively shorter than another, longer monitoring time period. The information signal is repeatedly transmitted by a Radio Network Node (RNN) with a first periodicity during the longer monitoring time period and with a second periodicity during the shorter monitoring time period, the first periodicity being longer than the second periodicity. The first communications device and the RNN are configured to operate in a wireless communications network.

The network node is configured to determine that the first communications device is to be configured for monitoring reception of the information signal within one or more shorter monitoring time periods.

Further, the network node is configured to configure the first communications device with a Discontinuous Reception (DRX) cycle indicating a monitoring time point falling within the one or more shorter monitoring time periods.

According to another aspect of embodiments herein, the object is achieved by a method performed by a first communications device for monitoring reception of an information signal in monitoring time periods of different time durations, one time period being relatively shorter than another, longer time period. The information signal is repeatedly transmitted by a Radio Network Node (RNN) with a first periodicity during the longer time period and with a second periodicity during the shorter time period, the first periodicity being longer than the second periodicity. The first communications device and the RNN operate in a wireless communications network.

The first communications device receives, from the RNN, a configuration configuring the first communications device with a Discontinuous Reception, DRX, cycle indicating a monitoring time point falling within one or more shorter time periods.

Further, the first communications device monitors, at the monitoring time point, reception of the information signal in the one or more shorter time periods.

According to another aspect of embodiments herein, the object is achieved by a first communications device for monitoring reception of an information signal in monitoring time periods of different time durations, one time period being relatively shorter than another, longer time period. The information signal is repeatedly transmitted by a Radio Network Node (RNN) with a first periodicity during the longer time period and with a second periodicity during the shorter time period, the first periodicity being longer than the second periodicity. The first communications device and the RNN are configured to operate in a wireless communications network.

The first communications device is configured to receive, from the RNN, a configuration configuring the first communications device with a Discontinuous Reception, DRX, cycle indicating a monitoring time point falling within one or more shorter time periods.

Further, the first communications device is configured to monitor, at the monitoring time point, reception of the information signal in the one or more shorter time periods.

According to another aspect of embodiments herein, the object is achieved by a computer program, comprising instructions which, when executed on at least one processor, causes the at least one processor to carry out the method performed by the network node.

According to another aspect of embodiments herein, the object is achieved by a computer program, comprising instructions which, when executed on at least one processor, causes the at least one processor to carry out the method performed by the first communications device.

According to another aspect of embodiments herein, the object is achieved by a carrier comprising the computer program, wherein the carrier is one of an electronic signal, an optical signal, a radio signal or a computer readable storage medium.

Since the network node determines that the first communications device is to be configured for monitoring reception of the information signal within one or more shorter monitoring time periods, and since the network node configures the first communications device with a DRX cycle indicating a monitoring time point falling within the one or more shorter monitoring time periods, the first communications device is more optimally allocated resources for monitoring reception of the information signal. Thereby, the first communications device preserves energy and increases its longevity, e.g. it's battery lifetime and available standby time. This results in an improved performance in the wireless communications network.

An advantage with some embodiments disclosed herein is that by adapting the DRX cycle and the one or more shorter monitoring time periods, the network node provides an operation that consumes less energy and produces less interference as compared to prior art.

Another advantage with some embodiments disclosed herein is that network range may be increased due to the higher channel coherency allowing for more coherent averaging.

BRIEF DESCRIPTION OF DRAWINGS

Examples of embodiments herein will be described in more detail with reference to attached drawings in which.

DETAILED DESCRIPTION

An object addressed by embodiments herein is how to improve performance in a wireless communications network.

Therefore, as mentioned above, according to embodiments herein, a way of improving the performance in the wireless communications network is provided.

Some embodiments disclosed herein provide a method performed by a network node for configuring or scheduling communications devices in "variable sync transmissions". In other words, some embodiments herein relate to the configuring or scheduling of communications devices for reception of an information signal transmitted at a variable periodicity. The information signal may be a synchronization signal, or a Synchronization Signal Block (SSB).

It may be determined that a communications device should be scheduled for monitoring, e.g. tracking and/or paging, reception of the information signal within a shorter time period P2 wherein the information signal is transmitted with a shorter periodicity.

The communications device may then be configured with tracking and/or paging monitoring DRX cycles falling within the shorter time period P2. For long DRX cycles, the communications devices are allocated so as to obtain a relatively even loading over the available shorter time periods P2. Also, within the shorter time periods P2, a preference towards the start or the end of the time periods P2 may exist which may be taken into consideration.

Furthermore, some embodiments disclosed herein comprise a method to configure and reconfigure the duration of the second sync interval, P2, in relation to the first interval, P1, taking into consideration the number of attached communications devices requiring paging or random access allocation in the second sync interval.

Figure 1:
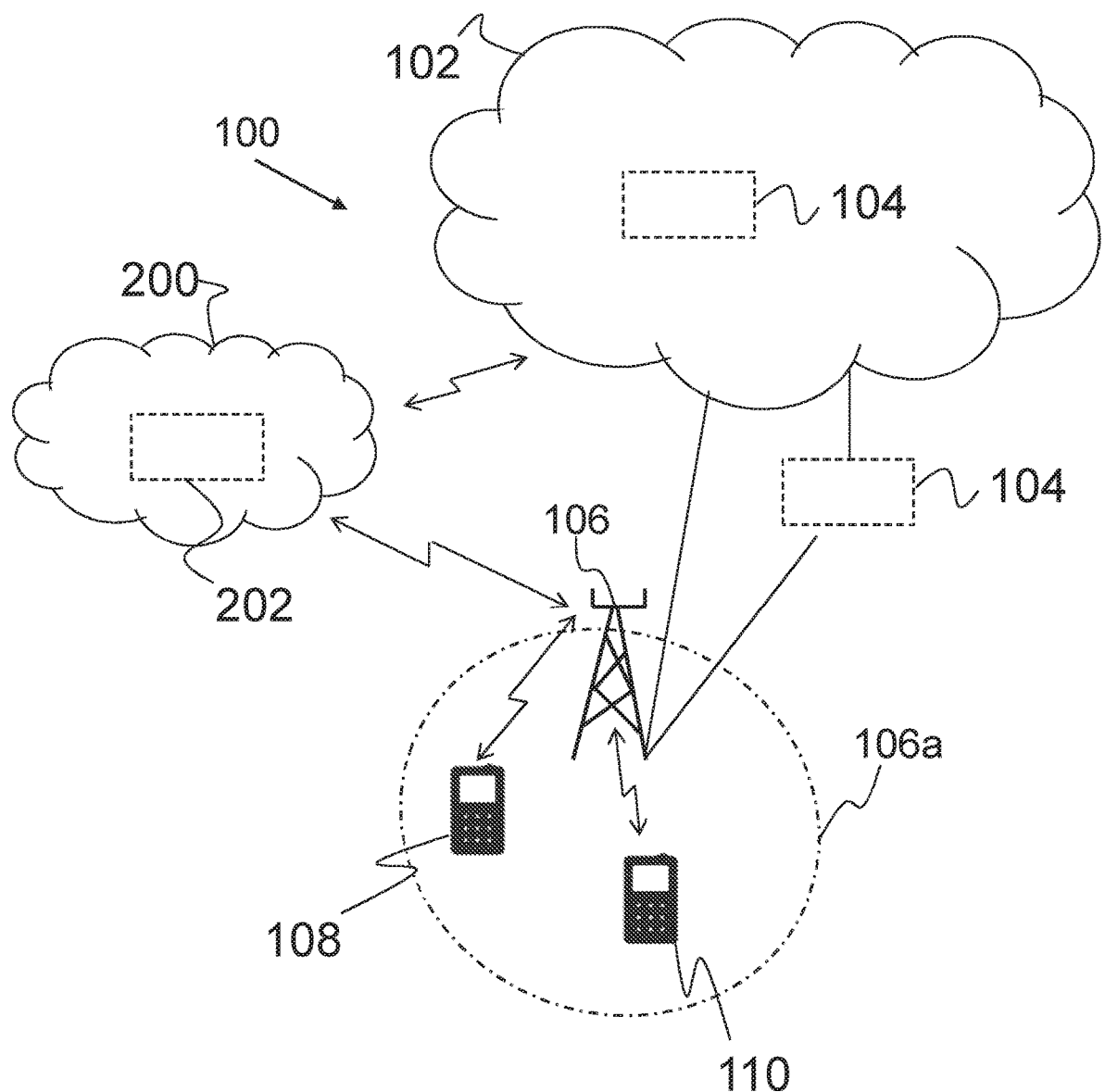
FIG. 1 schematically illustrates embodiments of a wireless communications network.

FIG. 1 depicts an example of a wireless communications network 100 wherein embodiments herein may be implemented. The wireless communications network 100 is a wireless communication network such as a New Radio (NR) network, a 5G network, an LTE network, a Wideband Code Division Multiple Access (WCDMA) network, a GSM network, any 3GPP cellular network, a Worldwide Interoperability for Microwave Access (WMAX) network, a Wireless Local Area Network (WLAN), a Low Rate Wireless Personal Access Network (LR-WPAN) as defined in e.g. IEEE 802.15.4, a Bluetooth network, a SIGFOX network, a Zigbee network, a Bluetooth Low Energy (BLE) network such as a Bluetooth Smart network, or a Cellular Internet of Things (CIoT) network such as an Enhanced Coverage GSM-IoT (EC-GSM-IoT) network, a Narrow Band IoT (NB-IoT) network or a network comprising one or more wireless devices configured for Machine Type Communication (MTC) sometimes herein referred to as an eMTC network, may also benefit from exploiting the ideas covered within this disclosure.

A core network 102 is comprised in the wireless communications network 100. The core network 202 is a wireless core network such as an NR core network, a 5G core network, GERAN core network, an LTE core network, e.g. an Evolved Packet Core (EPC); a WCDMA core network; a GSM core network; any 3GPP core network; WMAX core network; or any wireless or cellular core network operating in the wireless communications network 100.

A core network node 104 is operates in the core network 102. The core network node 104 may be a Mobile Switching Center (MSC), a Mobility Management Entity (MME), an Operations and Maintenance (O&M) node, an Operations Support System (OSS), a Self-organizing Network (SON), a positioning node, e.g. Enhanced Serving Mobile Location Center (E-SMLC), a Mobile Data Terminal (MDT), a Serving GateWay (S-GW), a Serving General Packet Radio Service (GPRS) Node (SGSN), etc.

A Radio Network Node (RNN) 106 serving a coverage area 106a, e.g. a serving area or a cell such as a serving cell, operates in the wireless communications network 100. It should be understood that more than one RNN may be operating in the wireless communications network 100 and that one RNN may be configured to serve several coverage areas. However, in FIG. 1 only one coverage area 106a is illustrated.

Examples of a RNN is a gNB, a NodeB, an eNB, a Master eNB (MeNB), a Serving eNB (SeNB), a network node belonging to a Master Cell Group (MCG) or a Secondary Cell Group (SCG), a Base Station (BS), a Multi-Standard Radio (MSR) radio node such as a MSR BS, a network controller, a Radio Network Controller (RNC), a Base Station Controller (BSC), a relay node, a donor node controlling relay, a Base Transceiver Station (BTS), an Access Point (AP), a transmission point, a transmission node, a Remote Radio Unit (RRU), a Remote Radio Head (RRH), a node in a Distributed Antenna System (DAS).

A first communications device 108 is operating in the wireless communications network 100. The first communications device 108 is located in the wireless communications network 100. Further, a second communications device 110 may operate in the wireless communications network 100.

In some embodiments the non-limiting term communications device is used and it refers to any type of communications device communicating with a network node and/or with another communications device in for example a cellular or wireless communication network. Examples of a communications device are a UE, a Device-to-Device (D2D) UE, a machine type UE or UE capable of machine to machine (M2M) communication, a Personal Digital Assistant (FDA), a tablet, a mobile terminal, a wireless device, a smart phone, a Laptop Embedded Equipped (LEE), a Laptop Mounted Equipment (LME), a Universal Serial Bus (USB) dongle, a Customer premises Equipment (CPE), an IoT device, a Machine Type Communications (MTC) device, etc. In this disclosure the terms communications device, wireless device and UE may be used interchangeably.

A computer cloud or computer network 200 may be connected to or is comprised in the wireless communications network 100. In some embodiments, wherein the computer cloud 200 is connected to the wireless network 100 it should be understood that the computer cloud 200 is communicatively connected to the wireless communications network 100, and that the connection providing the communication may be a wireless connection or a wired connection. The computer cloud 200 may correspond to or be comprised in a system of servers or computers. In this disclosure, the terms computer cloud and computer network are used interchangeably.

A cloud node 202 may operate in the computer network 200. As previously mentioned, the cloud node 202 is a node, e.g. an external node, corresponding to or being comprised in a so called computer, or computing, cloud, that also may be referred to as a cloud system of servers or computers, or simply be named a cloud for providing certain service(s) to outside the cloud via a communication interface. The exact configuration of nodes etc. comprised in the cloud in order to provide said service(s) may not be known outside the cloud. The name "cloud" is often explained as a metaphor relating to that the actual device(s) or network element(s) providing the services are typically invisible for a user of the provided service(s), such as if obscured by a cloud.

In some embodiments the general term "network node" is used and it may correspond to any type of radio network node, core network node, cloud node or any other network node, which communicates with a communications device and/or with another network node. Thus, the network node may be the core network node 104, the RNN 106 or the cloud node 202. Therefore, sometimes in this disclosure reference is made to the network node 104, 106, 202.

In this section, some embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Also note that terminology such as gNB, eNodeB and UE should be considering non-limiting and does in particular not imply a certain hierarchical relation between the two; in general "eNodeB" could be considered as device 1 and "UE" device 2, and these two devices communicate with each other over some radio channel.

It should also be understood that some actions described in this disclosure as being performed in the downlink may also or alternatively be performed in the uplink.

Figure 2:
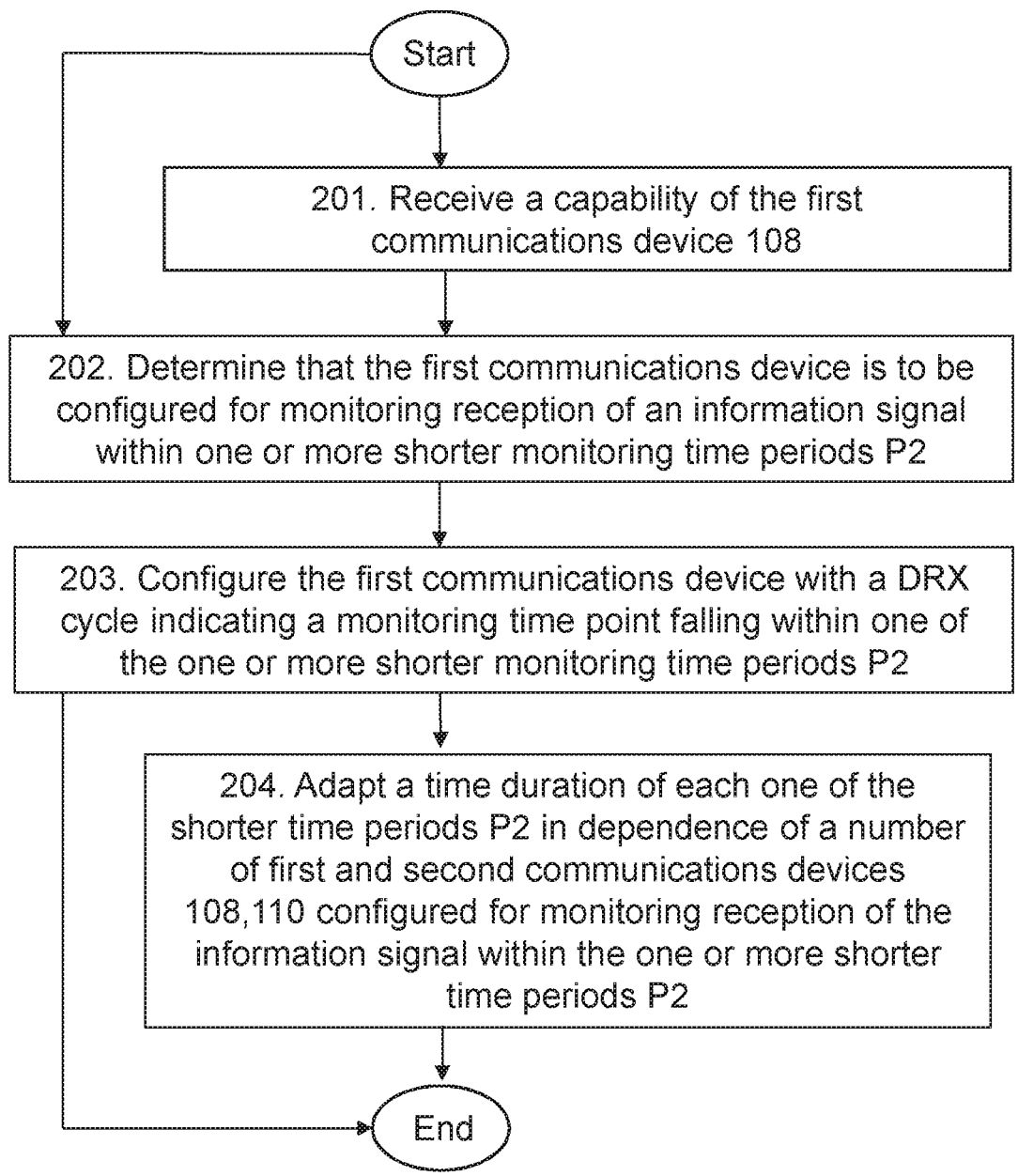
FIG. 2 is a flowchart depicting embodiments of a method performed by a network node.
Figure 3:
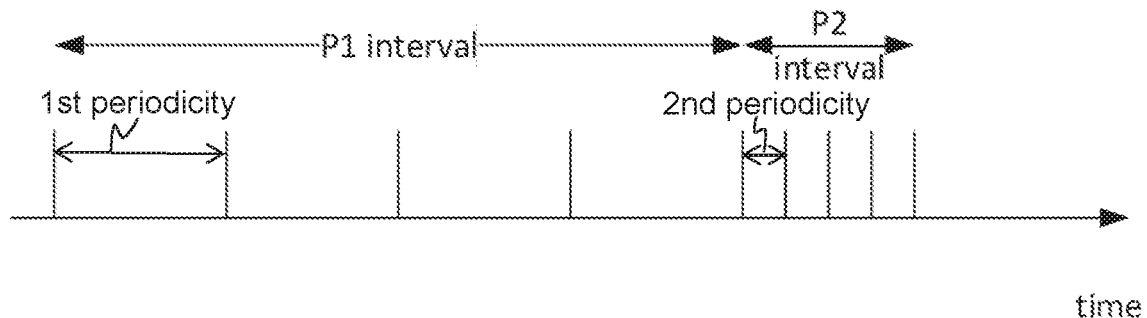
FIG. 3 schematically illustrates transmissions of an information signal with a first periodicity during a longer monitoring time period P1 and with a second periodicity during a shorter monitoring time period P2.

An example of a method performed by the network node 104, 106, 202 for configuring a first communications device 108 to monitor reception of an information signal in monitoring time periods P1, P2 of different time durations, will now be described with reference to a flowchart depicted in FIG. 2. One monitoring time period P2 is relatively shorter than another, longer monitoring time period P1. The information signal is repeatedly transmitted by a RNN 106 with a first periodicity during the longer monitoring time period P1 and with a second periodicity during the shorter monitoring time period P2, the first periodicity being longer than the second periodicity. FIG. 3 schematically illustrates transmissions of an information signal with a first periodicity during a longer monitoring time period P1 and with a second periodicity during a shorter monitoring time period P2. In FIG. 3, the longer time period P1 is denoted P1 interval, and the shorter time period P2 is denoted P2 interval.

The information signal may be a synchronization signal, but it may also be a signal comprising broadcast information. Further, examples are a Primary Synchronization Signal (PSS), a Secondary Synchronization Signal (SSS), a Tertiary Synchronization Signal (TSS), a paging signal, a tracking signal, a Physical Broadcast Channel (PBCH), a Synchronization Signal Block (SSB), a Discovery Reference Signal (DRS) just to give some examples. Broadcast signalling may comprise master information, i.e., a subset of the essential minimum system information required to perform random access. The information signal may also relate to or comprise a Physical Downlink Shared Channel System Information Block (PDSCH_SIB), i.e., remaining system information required for random access, but not included in the PBCH.

Further, the first communications device 108 and the RNN 106 operate in the wireless communications network 100. The RNN 106 is arranged to operate in a time structure associated with a clock and arranged to transmit the information signal associated with the time structure.

The methods comprise one or more of the following actions. It should be understood that these actions may be taken in any suitable order and that some actions may be combined.

Action 201

In some embodiments, the network node 104, 106, 202 receives information relating to a capability of the first communications device 108. This may be done in order to inform the network node 104, 106, 202 about how resources may be allocated to the first communications device 108 in order to preserve energy and increase longevity of the first communications device 108.

The capability of the first communications device 108 may be one or more out of a hardware capability, a link budget related capability; and a use case related capability.

Examples of a hardware capability are Local Oscillator (LO) accuracy, e.g. a low LO accuracy requires longer time period P2 to make sure the communication device will start reception within the interval, limited processing and/or memory capabilities which require longer P2 because the communications device might not be able to use sophisticated signal processing techniques, a single antenna communications device, less expensive crystal for decreased power consumption and reduced cost.

Examples of a link budget related capability are single antenna, extra reliable communications, increased range communications, required SINR for reception, minimum time for reception in order to allow multiple attempts or accumulation of energy just to give some examples.

Examples of use case related capability are longevity, information load for e.g. MTC, communication periodicity, e.g. periodicity at which the communication device requires communication with the network, e.g. once per minute, hour, day, week, etc. just to give some examples.

In some embodiments, the network node 104, 106, 202 receives information from the first communications device 108 regarding its capabilities to maintain synchronization.

For example, this may be realized by signaling different device classes, e.g. UE classes, through capability signaling.

Action 202

The network node 104, 106, 202 determines that the first communications device 108 is to be configured for monitoring reception of the information signal within one or more shorter monitoring time periods P2.

The reasons why the first communications device 108 is to be configured for monitoring reception of the information signal within the one or more monitoring time periods P2 may be several. For example, the first communications device 108 may connect sufficiently seldom to the network node 104, 106, e.g. the RNN 106, and therefore have to perform synchronization at each wakeup occasion. By the expression sufficiently seldom is meant that the time-frequency reference of the communications device will deviate to such a degree that the device will be unable to connect, i.e., unable to receive and transmit, to the network without first resyncing with it. In other words, by sufficiently seldom is meant that the time between wakeups is longer than the time the communications device is able to maintain synchronization while sleeping. As a further example, the first communications device 108 may be of a low quality such that it has a large LO drift, e.g. an LO (crystal, XO) that deviates faster and to a larger extent from a desired frequency, e.g., due to temperature variations, aging etc. The Local Oscillator drift may also be explained as how "wrong" the communications device's local oscillator is compared to the one in the network node. This drift will accumulate over time resulting in that the device cannot maintain synchronization, i.e. its notion of when certain signals are transmitted is not the same as when they are really transmitted. As yet a further example, the first communications device 108 may have such a poor performance, such a low link quality, or such a high coupling loss that averaging over several information signals is required in order to obtain a sufficient signal quality for performing synchronization to the network node 104, 106, 202.

As described in Action 201, the first communications device 108 may signal hardware related capability information ahead of the determination of the configuration of the monitoring, e.g. ahead of a scheduling decision.

Thus, as described in Action 201 and in some embodiments, the network node 104,106,202 receives information relating to a capability of the first communications device 108. In such embodiments, the network node 104, 106, 202 determines, based on the received information, that the first communications device 108 is to be configured for monitoring reception of the information signal within the one or more shorter time periods P2.

In some embodiments, the network node 104, 106, 202 determines that the first communications device 108 is to be configured for monitoring reception of the information signal within the one or more shorter monitoring time periods P2 based on one or more out of an energy efficiency required by the first communications device 108, a signal quality required by the first communications device 108, a component accuracy of the first communications device 108, and a transmission and/or reception periodicity required by the first communications device 108.

For example, the signal quality required by the first communications device 108 may be an SINR. The first communications device 108 may signal how may repetitions of a monitored signal it needs to be able to receive the monitored signal at a particular SINR. Thus, a single antenna device may typically need to replace the antenna diversity with time (repetition) diversity.

An example of a component accuracy of the first communications device 108 is how long time the communications device is able to maintain synchronization while sleeping, which depends on the accuracy of the local oscillator. Further examples are LO crystal quality in a Phased Locked Loop (PLL), or an overall low power PLL design implying faster decay in frequency accuracy.

Further, the transmission periodicity required by the first communications device 108 may be periodicity in a sensor transmitting a report or an actuator receiving an instruction. Further, the communications device may signal how often it needs to access the network, for example once per minute, hour, day or week.

In some embodiments, the subinterval of each shorter time period P2 is a continuous subinterval comprising a part in the beginning of each shorter time period P2, a middle part of each shorter time period P2, or a part in the end of each shorter time period P2.

The one or more shorter monitoring time periods P2 may be comprised in a first group of one or more shorter monitoring periods P2. In some embodiments, the network node 104, 106, 202 determines that the first communications device 108 is to be configured for monitoring reception of the information signal within the one or more shorter monitoring time periods P2 by determining that a number of second communications devices 110 configured for monitoring reception of the information signal in the first group is lesser than a number of second communications devices 110 configured for monitoring reception of the information signal in a second group of one or more shorter time periods P2. Thereby, the load in the one or more shorter time periods P2 is more evenly distributed.

In some embodiments, the network node 104, 106, 202 determines that the first communications device 108 is to be configured for monitoring reception of the information signal within the one or more shorter monitoring time periods P2 based on an estimation of one or more reception conditions. The one or more reception conditions may be based on e.g. measurement reports, CQI reports and/or UL pathloss estimates.

It should be understood that the first communications device 108 may belong to a group of communications devices which group is related to a certain beam, e.g. receives signal transmissions during a certain direction of a beam sweeping process. Some embodiments comprise a plurality of such groups of communications devices, wherein each group relates to a certain beam.

Additionally or alternatively, the network node 104, 106, 202 may make one or more decisions related to a scheduling setup. One such decision may be to allocate the first communications device 108 in a certain subinterval of the one or more shorter time periods P2, e.g. the first half or the second half, with respect to paging or random access. Here, e.g. a need for averaging would typically result in an earlier scheduling to allow the first communications device 108 to perform averaging efficiently. Other features may involve scheduling communications devices, e.g. the first communications device 108, transmitting data at the end of the interval since then the random access may take place outside the one or more shorter time periods P2. Yet another reason may be to get an even distribution of communications devices within the one or more shorter time periods P2.

The scheduling decision may concern the choice of a particular one of the one or more shorter time periods P2 during a DRX cycle assigned to the first communications device 108. The DRX cycle is often much longer, e.g. minutes or hours, than the P1/P2 alternation rate which is in the range of seconds. In order to ensure that all shorter time periods P2 are relatively equally utilized for paging and/or random access, the network node 104, 106, 202 may choose to configure the DRX cycle of the first communications device 108 so that it falls within one of the one or more shorter time periods P2 where few other nodes, e.g. few other communications devices, are configured. This avoids overloading some of the one or more shorter time periods P2 with excessively many communication devices' DRX cycles.

Some embodiments, wherein the information signal is a PDSCH_SIB, may also imply a scheduling decision by the network node. The scheduling decision may for example be to determine to transmit a PDSCH_SIB adjacent to the shorter time period P2.

Action 203

The network node 104, 106, 202 configures the first communications device 108 with a DRX cycle indicating a monitoring time point falling within the one or more shorter monitoring time periods P2.

In some embodiments, the network node 104, 106, 202 configures the first communications device 108 with a time offset and a time periodicity for the DRX cycle, wherein the time offset indicates a starting time point of a first shorter time period $P2_1$ of the one or more shorter time periods P2 and the time periodicity indicates a time difference between the starting time point of the first shorter time period $P2_1$ and a starting time point of a subsequent second shorter time period $P2_2$ of the one or more shorter time periods P2.

The network node 104, 106, 202 may configure the first communications device 108 by conveying the new settings to the first communications device 108. For example, this may be a change in paging parameters or random access parameters to the one or more affected communications devices, e.g. the first communications device 108. The change may relate to a change in the DRX period and the DRX alignment, or to a change in the longer time period P1 and/or the shorter time period P2 according to the made decision. The configuring may also be made through e.g. a Discovery Signal Measurement Timing Configuration (DMTC).

Action 204

In some embodiments, the network node 104, 106, 202 adapts a time duration of each one of the one or more shorter time periods P2 in dependence of a number of first and second communications devices 108,110 configured for monitoring reception of the information signal within the one or more shorter time periods P2.

Thus, the network node 104, 106, 202 may identify a need for extending the duration of the one or more shorter time periods P2 to accommodate more communications devices, e.g. the first communications device 108 and one or more second communications devices 110, that require the short synchronization period. In some embodiments, the network node 104, 106, 202 may reduce the length of the longer time period P1 to maintain a total repetition time period, e.g. the overall P1+P2 repetition time period. This may be done to fit the extra communications devices into the interval, with respect to transmission limitations, e.g. when too many communications devices being scheduled, or when there is a need for an extended averaging over several information signals. Also, specific timing needs of a communications device, e.g. the first communications device 108, may affect the scheduling, so that the communications device is scheduled within the interval in a way such that the need is fulfilled. In some situations, the distribution of the time intervals P1 and P2 takes any restrictions on medium occupancy, e.g. based on regulation, into account.

In some embodiments, the network node 104, 106, 202 may adapt the one or more shorter time periods P2 such that the first communications device 108 is only operating with the longer time period P1. This may be done by adapting the length of the one or more second time periods P2 and setting the time period of the one or more shorter time periods P2 equal to zero. Further, this may be the case when no other communications devices, e.g. IoT devices, or other communications devices requiring one or more shorter time period P2 are present. Further, the network node 104, 106, 202 may turn on the one or more shorter time periods P2 only when such communications devices are configured for paging by the network node 104, 106, 202. This may be done by adapting the length of the one or more second time periods P2 and setting the time period of the one or more shorter time periods P2 larger than zero.

Figure 4:
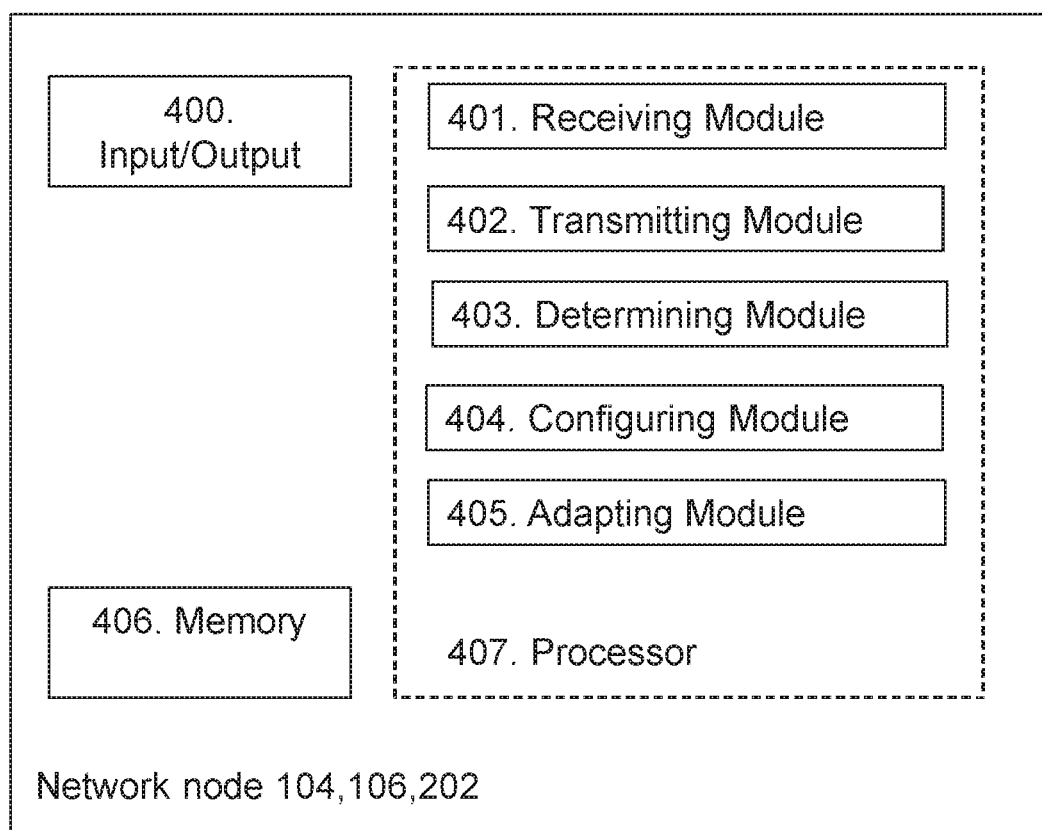
FIG. 4 is a schematic block diagram illustrating embodiments of a network node.

To perform the method for configuring the first communications device 108 to monitor reception of an information signal in monitoring time periods P1, P2 of different time durations, the network node 104,106,202 may be configured according to an arrangement depicted in FIG. 4. As mentioned above, one monitoring time period P2 is relatively shorter than another, longer monitoring time period P1. The information signal is repeatedly transmitted by a RNN 106 with a first periodicity during the longer monitoring time period P1 and with a second periodicity during the shorter monitoring time period P2, the first periodicity being longer than the second periodicity. As previously mentioned, the information signal may be a synchronization signal, but it may also be a signal comprising broadcast information. Further examples are a PSS, an SSS, a TSS, a paging signal, a tracking signal, a PBCH, an SSB, a DRS just to give some examples. Further, the first communications device 108 and the RNN 106 are configured to operate in the wireless communications network 100. The RNN 106 is arranged to operate in a time structure associated with a clock and arranged to transmit an information signal associated with the time structure.

In some embodiments, the network node 104, 106, 202 comprises an input and/or output interface 400 configured to communicate with one or more communications devices, e.g. the second communications device 110 and/or one or more network nodes 104, 106, 202, e.g. the core network node 104, the RNN 106 and/or the cloud node 202. The input and/or output interface 400 may comprise a wireless receiver (not shown) and a wireless transmitter (not shown).

The network node 104, 106, 202 is configured to receive, by means of a receiving module 401 configured to receive, a transmission, e.g. a data packet, a signal or information, from one or more network node 104, 106, 202, e.g. the core network node 104, the RNN 106 and/or the cloud node 202 and/or from one or more communications devices, e.g. the first communications device 108 and/or the second communications device 110. The receiving module 401 may be implemented by or arranged in communication with a processor 407 of the network node 104, 106, 202. The processor 407 will be described in more detail below.

In some embodiments, the network node 104, 106, 202 is configured to receive information relating to a capability of the first communications device 108. The capability of the first communications device 108 may be one or more out of a hardware capability, a link budget related capability, and a use case related capability.

The network node 104, 106, 202 may directly or indirectly receive the capability information from the first communications device 108. For example, when the network node is the RNN 106 it may directly receive the information from the first communications device 108. However, when the network node is the core network node 104 or a cloud node 202 it may indirectly receive the information from the first communications device 108 via the RNN 106.

The network node 104, 106, 202 is configured to transmit, by means of a transmitting module 402 configured to transmit, a transmission, e.g. a data packet, a signal or information, to one or more network node 104, 106, 202, e.g. the core network node 104, the RNN 106 and/or the cloud node 202 and/or to one or more communications devices, e.g. the first communications device 108 and/or the second communications device 110. The transmitting module 402 may be implemented by or arranged in communication with the processor 407 of the network node 104, 106, 202.

The network node 104, 106, 202 may directly or indirectly transmit the information signal to the first communications device 108. For example, when the network node is the RNN 106 it may directly transmit the information signal to the first communications device 108. However, when the network node is the core network node 104 or a cloud node 202 it may indirectly transmit the information signal to the first communications device 108 via the RNN 106.

The network node 104, 106, 202 is configured to determine, by means of a determining module 403 configured to determine, that the first communications device 108 is to be configured for monitoring reception of the information signal within the one or more shorter time periods P2. The determining module 403 may be implemented by or arranged in communication with the processor 407 of the network node 104, 106, 202.

In some embodiments, wherein the network node 104, 106, 202 has received information relating to the capability of the first communications device 108, the network node 104, 106, 202 may determine that the first communications device 108 is to be configured for monitoring reception of the information signal within the one or more shorter time periods P2 is based on the received information.

The network node 104, 106, 202 may be configured to determine that the first communications device 108 is to be configured for monitoring reception of the information signal within the one or more shorter monitoring time periods P2 based on one or more out of an energy efficiency required by the first communications device 108, a signal quality required by the first communications device 108, a component accuracy of the first communications device 108, and a transmission and/or reception periodicity required by the first communications device 108.

In some embodiments, the network node 104, 106, 202 is configured to determine that the first communications device 108 is to be configured for monitoring reception of the information signal within a subinterval of each shorter time period P2, The subinterval of each shorter time period P2 may be a continuous subinterval comprising a part in the beginning of each shorter time period P2, a middle part of each short time period P2, or a part in the end of each short time period P2.

In some embodiments, the one or more shorter monitoring time periods P2 are comprised in a first group of one or more shorter monitoring periods P2. In such embodiments, the network node 104, 106, 202 may be configured to determine that the first communications device 108 is to be configured for monitoring reception of the information signal within the one or more shorter monitoring time periods P2 by determining that a number of second communications devices 110 configured for monitoring reception of the information signal in the first group is lesser than a number of second communications devices 110 configured for monitoring reception of the information signal in a second group of one or more shorter time periods P2.

In some embodiments, the network node 104, 106, 202 is configured to determine that the first communications device 108 is to be configured for monitoring reception of the information signal within the one or more shorter monitoring time periods P2 based on an estimation of one or more reception conditions. As previously mentioned, the one or more reception conditions may be based on e.g. measurement reports, CQI reports and/or UL pathloss estimates.

Additionally or alternatively, the network node 104, 106, 202 may be configured to make one or more decisions related to a scheduling setup. The scheduling decision may concern the choice or determination of a particular one of the one or more shorter time periods P2 during a DRX cycle assigned to the first communications device 108. The DRX cycle is often much longer, e.g. minutes or hours, than the P1/P2 alternation rate which is in the range of seconds. In order to ensure that all shorter time periods P2 are relatively equally utilized for paging and/or random access, the network node 104, 106, 202 may be configured to choose to configure the DRX cycle of the first communications device 108 so that it falls within one of the one or more shorter time periods P2 where few other nodes, e.g. few other communications devices, are configured. As previously mentioned, this avoids overloading some of the one or more shorter time periods P2 with excessively many communication devices' DRX cycles.

The network node 104, 106, 202 is configured to configure, by means of a configuring module 404 configured to configure, the first communications device 108 with a DRX cycle indicating a monitoring time point falling within the one or more shorter monitoring time periods P2. The configuring module 404 may be implemented by or arranged in communication with the processor 406 of the network node 104, 106, 202.

In some embodiments, the network node 104, 106, 202 is configured to configure the first communications device 108 with the DRX cycle indicating the monitoring time point falling within the one or more shorter time periods P2 by configuring the first communications device 108 with a time offset and a time periodicity for the DRX cycle. The time offset indicates a starting time point of a first shorter time period $P2_1$ of the one or more shorter time periods P2 and the time periodicity indicates a time difference between the starting time point of the first shorter time period $P2_1$ and a starting time point of a subsequent second shorter time period $P2_2$ of the one or more shorter time periods P2.

The network node 104, 106, 202 may be configured to configure the first communications device 108 by conveying, e.g. transmitting, the new settings to the first communications device 108. For example, this may be a change in paging parameters or random access parameters to the one or more affected communications devices, e.g. the first communications device 108. As previously mentioned, the change may relate to a change in the DRX period and the DRX alignment, or to a change in the longer time period P1 and/or the shorter time period P2 according to the made decision.

The network node 104, 106, 202 is configured to adapt, by means of an adapting module 405 configured to adapt, a time duration of each one of the one or more shorter time periods P2. The adapting module 405 may be implemented by or arranged in communication with the processor 407 of the network node 104, 106, 202.

In some embodiments, the network node 104, 106, 202 is configured to adapt the time duration of each one of the one or more shorter time periods P2 in dependence of a number of first and second communications devices 108,110 configured for monitoring reception of the information signal within the one or more shorter time periods P2.

Thus, the network node 104, 106, 202 may be configured to identify a need for extending the duration of the one or more shorter time periods P2 to accommodate more communications devices, e.g. the first communications device 108 and one or more second communications devices 110, that require the short synchronization period P2. In some embodiments, the network node 104, 106, 202 may reduce the length of the longer time period P1 to maintain a total repetition time period, e.g. the overall P1+P2 repetition time period. This may be done to fit the extra communications devices into the interval, with respect to transmission limitations, e.g. when too many communications devices being scheduled, or when there is a need for an extended averaging over several information signals. Also, specific timing needs of a communications device, e.g. the first communications device 108, may affect the scheduling, so that the communications device is scheduled within the interval in a way such that the need is fulfilled. In some situations, the distribution of the time intervals P1 and P2 takes any restrictions on medium occupancy, e.g. based on regulation, into account.

In some embodiments, the network node 104, 106, 202 may be configured to adapt the one or more shorter time periods P2 such that the first communications device 108 is only operating with the longer time period P1. This may be done by adapting the length of the one or more second time periods P2 and setting the duration of the one or more shorter time periods P2 equal to zero. Further, this may be the case when no other communications devices, e.g. IoT devices, or other communications devices requiring one or more shorter time period P2 are present. Further, the network node 104, 106, 202 may be configured to turn on the one or more shorter time periods P2 only when such communications devices are configured for paging by the network node 104, 106, 202. This may be done by adapting the length of the one or more second time periods P2 and setting the duration of the one or more shorter time periods P2 larger than zero.

The network node 104, 106, 202 may also comprise means for storing data. In some embodiments, the network node 104, 106, 202 comprises a memory 406 configured to store the data. The data may be processed or non-processed data and/or information relating thereto. The memory 406 may comprise one or more memory units.

Further, the memory 406 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the network node 104, 106, 202.

Embodiments herein for configuring the first communications device 108 to monitor reception of an information signal in monitoring time periods P1, P2 of different time durations may be implemented through one or more processors, such as the processor 407 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the network node 104, 106, 202. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the network node 104, 106, 202.

Those skilled in the art will also appreciate that the input/output interface 400, the receiving module 401, the transmitting module 402, the determining module 403, the configuring module 404, the adapting module 405, and one or more other modules may refer to a combination of analogue and digital circuits, and/or one or more processors configured with software and/or firmware, e.g. stored in the memory 406, that when executed by the one or more processors such as the processors in the network node 104, 106, 202 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 5:
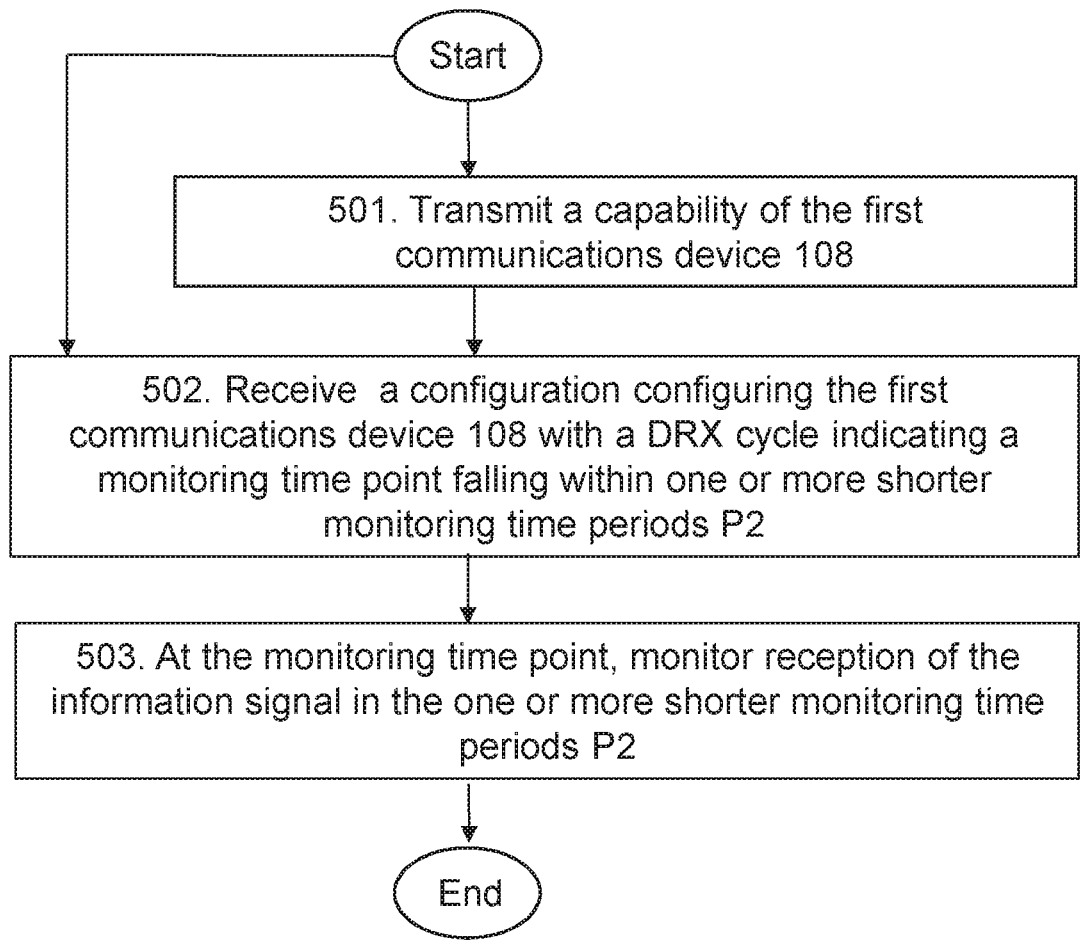
FIG. 5 is a flowchart depicting embodiments of a method performed by a first communications device.

An example of a method performed by the first communications device 108 for monitoring reception of an information signal in monitoring time periods P1, P2 of different time durations, will now be described with reference to a flowchart depicted in FIG. 5. As previously mentioned, one monitoring time period P2 is relatively shorter than another, longer monitoring time period P1. The information signal is repeatedly transmitted by a RNN 106 with a first periodicity during the longer monitoring time period P1 and with a second periodicity during the shorter monitoring time period P2, the first periodicity being longer than the second periodicity.

As previously mentioned, the information signal may be a synchronization signal, but it may also be a signal comprising broadcast information. As also previously mentioned, further examples are a PSS, an SSS, a TSS, a paging signal, a tracking signal, a PBCH, an SSB, a DRS just to give some examples. Further, the first communications device 108 and the RNN 106 operate in the wireless communications network 100.

The methods comprise one or more of the following actions. It should be understood that these actions may be taken in any suitable order and that some actions may be combined.

Action 501

In some embodiments, the first communications device 108 transmits, to the network node 104, 106, 202, information relating to a capability of the first communications device 108. As previously mentioned, the capability of the first communications device 108 is one or more out of a hardware capability, a link budget related capability, and a use case related capability.

As previously mentioned and in some embodiments, the first communications device 108 transmits information relating to its capabilities to maintain synchronization. For example, this may be realized by signaling different device classes, e.g. UE classes, through capability signaling. The device class may determine the speed at which data may be transferred in the uplink and downlink directions. Examples of devices classes are LTE Cat. 0-16, LTE Cat. M1, LTE Cat. NB 1, just to give some examples.

Action 502

The first communications device 108 receives, from or via the RNN 106, a configuration configuring the first communications device 108 with a DRX cycle indicating a monitoring time point falling within one or more shorter time periods P2.

In some embodiments, the configuration comprises a time offset and a time periodicity for the DRX cycle. The time offset may indicate the starting time point of a first shorter time period $P2_1$ of the one or more shorter time periods P2 and the time periodicity may indicate a time difference between the starting point of the first shorter time period $P2_1$ and a starting time point of a second shorter time period $P2_2$ of the one or more shorter time periods P2.

Action 503

The first communications device 108 monitors, at the monitoring time point, reception of the information signal in the one or more shorter time periods P2.

In some embodiments, the first communications device 108 monitors the reception of he information signal in the one or more shorter time periods P2 by monitoring reception of the information signal within a subinterval of each shorter time period P2 of the one or more shorter time periods P2.

The subinterval of each shorter time period P2 may be a continuous subinterval comprising a part in the beginning of each shorter time period P2, a middle part of each short time period P2, or a part in the end of each short time period P2.

Figure 6:
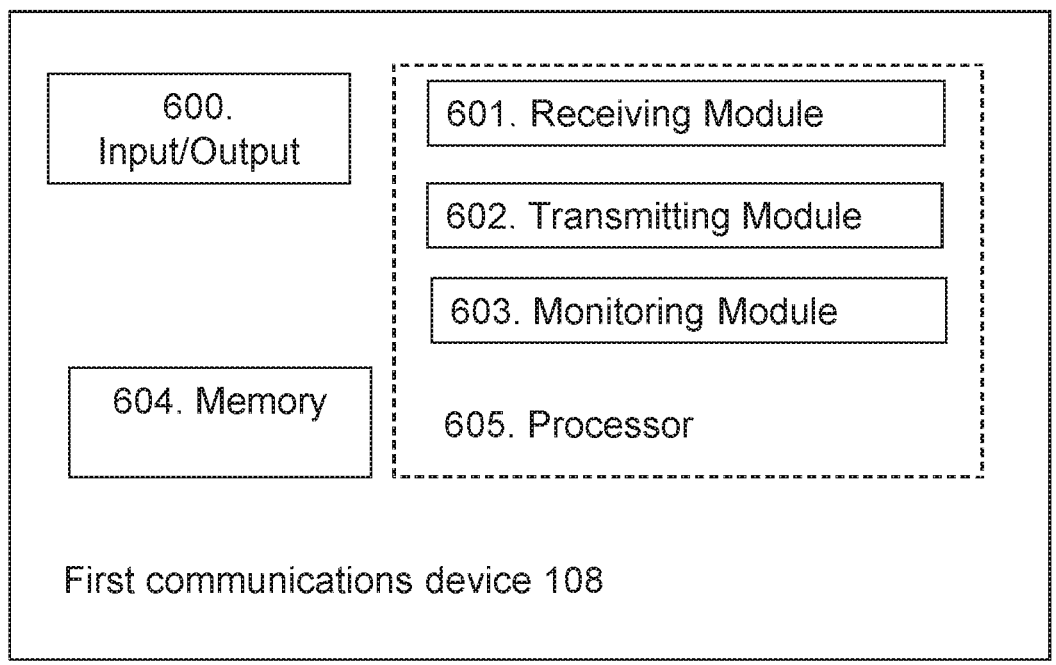
FIG. 6 is a schematic block diagram illustrating embodiments of a first communications device.

To perform the method for monitoring reception of an information signal in monitoring time periods P1, P2 of different time durations, the first communications device 108 may be configured according to an arrangement depicted in FIG. 6. As mentioned above, one monitoring time period P2 is relatively shorter than another, longer monitoring time period P1. The information signal is repeatedly transmitted by a RNN 106 with a first periodicity during the longer monitoring time period P1 and with a second periodicity during the shorter monitoring time period P2, the first periodicity being longer than the second periodicity. As also previously mentioned, the information signal may be a synchronization signal, but it may also be a signal comprising broadcast information. As also previously mentioned, further examples are a PSS, an SSS, a TSS, a paging signal, a tracking signal, a PBCH, an SSB, a DRS just to give some examples. Further, the first communications device 108 and the RNN 106 are configured to operate in the wireless communications network 100.

In some embodiments, the first communications device 108 comprises an input and/or output interface 600 configured to communicate with one or more communications devices, e.g. the second communications device 110 and/or one or more network nodes 104, 106, 202, e.g. the core network node 104, the RNN 106 and/or the cloud node 202. The input and/or output interface 600 may comprise a wireless receiver (not shown) and a wireless transmitter (not shown).

The first communications device 108 is configured to receive, by means of a receiving module 601 configured to receive, a transmission, e.g. a configuration, a data packet, a signal or information, from one or more network node 104, 106, 202, e.g. the core network node 104, the RNN 106 and/or the cloud node 202 and/or from one or more communications devices, e.g. the second communications device 110. The receiving module 601 may be implemented by or arranged in communication with a processor 605 of the first communications device 108. The processor 605 will be described in more detail below.

In some embodiments, the first communications device 108 is configured to receive, from the RNN 106, the configuration configuring the first communications device 108 with a DRX cycle indicating a monitoring time point falling within one or more shorter time periods P2.

In some embodiments, the configuration may comprise a time offset and a time periodicity for the DRX cycle. The time offset may indicate the starting time point of a first shorter time period $P2_1$ of the one or more shorter time periods P2 and the time periodicity may indicate a time difference between the starting point of the first shorter time period $P2_1$ and a starting time point of a second shorter time period $P2_2$ of the one or more shorter time periods P2.

The first communications device 108 is configured to transmit, by means of a transmitting module 602 configured to transmit, a transmission, e.g. a data packet, a signal or information, to one or more network node 104, 106, 202, e.g. the core network node 104, the RNN 106 and/or the cloud node 202 and/or to one or more communications devices, e.g. the second communications device 110. The transmitting module 602 may be implemented by or arranged in communication with the processor 605 of the first communications device 108.

In some embodiments, the first communications device 108 is configured to transmit, to the network node 104,106, 202, information relating to a capability of the first communications device 108. As previously mentioned, the capability of the first communications device 108 may be one or more out of a hardware capability, a link budget related capability, and a use case related capability.

The first communications device 108 is configured to monitor, by means of a monitoring module 603 configured to monitor, at the monitoring time point, reception of the information signal in the one or more shorter time periods P2. The monitoring module 603 may be implemented by or arranged in communication with the processor 605 of the first communications device 108.

In some embodiments, the first communications device 108 configured to monitor the reception of the information signal in the one or more shorter time periods P2 by monitoring reception of the information signal within a subinterval of each shorter time period P2 of the one or more shorter time periods P2.

The subinterval of each shorter time period P2 may be a continuous subinterval comprising a part in the beginning of each shorter time period P2, a middle part of each shorter time period P2, or a part in the end of each shorter time period P2.

The first communications device 108 may also comprise means for storing data. In some embodiments, the first communications device 108 comprises a memory 604 configured to store the data. The data may be processed or non-processed data and/or information relating thereto. The memory 604 may comprise one or more memory units. Further, the memory 604 may be a computer data storage or a semiconductor memory such as a computer memory, a read-only memory, a volatile memory or a non-volatile memory. The memory is arranged to be used to store obtained information, data, configurations, and applications etc to perform the methods herein when being executed in the first communications device 108.

Embodiments herein for monitoring reception of an information signal in monitoring time periods P1, P2 of different time durations may be implemented through one or more processors, such as the processor 605 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the first communications device 108. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first communications device 108. Those skilled in the art will also appreciate that the input/output interface 600, the receiving module 601, the transmitting module 602, and the monitoring module 603, and one or more other modules may refer to a combination of analogue and digital circuits, and/or one or more processors configured with software and/or firmware, e.g. stored in the memory 604, that when executed by the one or more processors such as the processors in the first communications device 108 perform as described above. One or more of these processors, as well as the other digital hardware, may be included in a single ASIC, or several processors and various digital hardware may be distributed among several separate components, whether individually packaged or assembled into a SoC.

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a network node for configuring a first communications device to monitor reception of an information signal in monitoring time periods of different time durations, one monitoring time period being shorter than another, longer monitoring time period, wherein the information signal is repeatedly transmitted by a Radio Network Node, RNN, with a first periodicity during the longer monitoring time period and with a second periodicity during the shorter monitoring time period, the first periodicity being longer than the second periodicity, wherein the first communications device and the RNN operate in a wireless communications network, and wherein the method comprises:

determining that the first communications device is to be configured for monitoring reception of the information signal within one or more shorter monitoring time periods; and configuring the first communications device with a Discontinuous Reception, DRX, cycle indicating a monitoring time point falling within the one or more shorter monitoring time periods, wherein each of the one or more shorter monitoring time periods comprises a plurality of subintervals, wherein each of the subintervals includes a transmission of the information signal, and wherein determining that the first communications device is to be configured for monitoring reception of the information signal within the one or more shorter monitoring time periods comprises:

determining that the first communications device is to be configured for monitoring reception of the information signal within fewer than all of the subintervals of each shorter monitoring time period, wherein the configuring of the first communications device with the DRX cycle indicating the monitoring time point falling within the one or more shorter monitoring time periods comprises:

configuring the first communications device with a time offset and a time periodicity for the DRX cycle, wherein the time offset indicates a starting time point of a first shorter monitoring time period of the one or more shorter monitoring time periods and the time periodicity indicates a time difference between the starting time point of the first shorter monitoring time period and a starting time point of a subsequent second shorter monitoring time period of the one or more shorter monitoring time periods.

2. The method of claim 1, wherein the determining that the first communications device is to be configured for monitoring reception of the information signal within the one or more shorter monitoring time periods is based on one or more out of:
   an energy efficiency required by the first communications device;
   a signal quality required by the first communications device;
   a component accuracy of the first communications device; and
   a transmission periodicity required by the first communications device.

3. The method of claim 1, wherein each of the subintervals of each shorter monitoring time period is a continuous subinterval, and wherein the plurality of subintervals includes a part in the beginning of each shorter time period, a middle part of each shorter monitoring time period, and a part in the end of each shorter monitoring time period.

4. The method of claim 1, wherein the one or more shorter monitoring time periods are comprised in a first group of one or more shorter monitoring periods, and wherein the determining that the first communications device is to be configured for monitoring reception of the information signal within the one or more shorter monitoring time periods comprises:
   determining that a number of second communications devices configured for monitoring reception of the information signal in the first group is lesser than a number of second communications devices configured for monitoring reception of the information signal in a second group of one or more shorter monitoring time periods.

5. The method of claim 1, further comprising:
   receiving information relating to a capability of the first communications device; and
wherein the determining that the first communications device is to be configured for monitoring reception of the information signal within the one or more shorter monitoring time periods is based on the received information.

6. The method of claim 5, wherein the capability of the first communications device is one or more out of:
   a hardware capability;
   a link budget related capability; and
   a use case related capability.

7. The method of claim 1, further comprising:
   adapting a time duration of each one of the one or more shorter monitoring time periods in dependence of a number of first and second communications devices configured for monitoring reception of the information signal within the one or more shorter monitoring time periods.

8. A method performed by a first communications device for monitoring reception of an information signal in monitoring time periods of different time durations, one monitoring time period being shorter than another, longer time period, wherein the information signal is repeatedly transmitted by a Radio Network Node, RNN, with a first periodicity during the longer time period and with a second periodicity during the shorter monitoring time period, the first periodicity being longer than the second periodicity, wherein the first communications device and the RNN operate in a wireless communications network, and wherein the method comprises:
   receiving, from the RNN, a configuration configuring the first communications device with a Discontinuous Reception, DRX, cycle indicating a monitoring time point falling within one or more shorter monitoring time periods;
   at the monitoring time point, monitoring reception of the information signal in the one or more shorter monitoring time periods,
   wherein each of the one or more shorter monitoring time periods comprises a plurality of subintervals, wherein each of the subintervals includes a transmission of the information signal, and
   wherein the monitoring of the reception of the information signal in the one or more shorter monitoring time periods comprises:
   monitoring reception of the information signal within fewer than all of the subintervals of each shorter monitoring time period of the one or more shorter monitoring time periods,
   wherein the configuration comprises a time offset and a time periodicity for the DRX cycle, and wherein the time offset indicates the starting time point of a first shorter monitoring time period of the one or more shorter monitoring time periods and the time periodicity indicates a time difference between the starting point of the first shorter monitoring time period and a starting time point of a second shorter monitoring time period of the one or more shorter monitoring time periods.

9. The method of claim 8, wherein each of the subintervals of each shorter monitoring time period is a continuous subinterval, and wherein the plurality of subintervals includes a part in the beginning of each shorter monitoring time period, a middle part of each shorter monitoring time period, and a part in the end of each shorter monitoring time period.

10. The method of claim 8, further comprising:
   transmitting, to the network node, information relating to a capability of the first communications device.

11. The method of claim 10, wherein the capability of the first communications device is one or more out of:
   a hardware capability;
   a link budget related capability; and
   a use case related capability.

12. A network node for configuring a first communications device to monitor reception of an information signal in monitoring time periods of different time durations, one monitoring time period being shorter than another, longer monitoring time period, wherein the information signal is repeatedly transmitted by a Radio Network Node, RNN, with a first periodicity during the longer monitoring time period and with a second periodicity during the shorter monitoring time period, the first periodicity being longer than the second periodicity, wherein the first communications device and the RNN operate in a wireless communications network, and wherein the network node is configured to:
   determine that the first communications device is to be configured for monitoring reception of the information signal within one or more shorter monitoring time periods; and configure the first communications device with a Discontinuous Reception, DRX, cycle indicating a monitoring time point falling within the one or more shorter monitoring time periods,
wherein each of the one or more shorter monitoring time periods comprises a plurality of subintervals, wherein each of the subintervals includes a transmission of the information signal, and
wherein the network node being configured to determine that the first communications device is to be configured for monitoring reception of the information signal within the one or more shorter monitoring time periods comprises the network node being configured to:
determine that the first communications device to be configured for monitoring reception of the information signal within fewer than all of the subintervals of each shorter monitoring time period,
wherein the network node being configured to configure the first communications device with the DRX cycle indicating the monitoring time point falling within the one or more shorter monitoring time periods comprises the network node being configured to:
configure the first communications device with a time offset and a time periodicity for the DRX cycle, wherein the time offset indicates a starting time point of a first shorter monitoring time period of the one or more shorter monitoring time periods and the time periodicity indicates a time difference between the starting time point of the first shorter monitoring time period and a starting time point of a subsequent second shorter monitoring time period of the one or more shorter monitoring time periods.

13. The network node of claim 12, wherein the one or more shorter monitoring time periods are comprised in a first group of one or more shorter monitoring periods, and wherein the network node is configured to determine that the first communications device is to be configured for monitoring reception of the information signal within the one or more shorter monitoring time periods by determining that a number of second communications devices configured for monitoring reception of the information signal in the first group is lesser than a number of second communications devices configured for monitoring reception of the information signal in a second group of one or more shorter monitoring time periods.

14. The network node of claim 12, further being configured to:
adapt a time duration of each one of the one or more shorter monitoring time periods in dependence of a number of first and second communications devices configured for monitoring reception of the information signal within the one or more shorter monitoring time periods.

15. A first communications device for monitoring reception of an information signal in monitoring time periods of different time durations, one monitoring time period being shorter than another, longer time period, wherein the information signal is repeatedly transmitted by a Radio Network Node, RNN, with a first periodicity during the longer time period and with a second periodicity during the shorter monitoring time period, the first periodicity being longer than the second periodicity, wherein the first communications device and the RNN operate in a wireless communications network, and wherein the first communications device is configured to:
receive, from the RNN, a configuration configuring the first communications device with a Discontinuous Reception, DRX, cycle indicating a monitoring time point falling within one or more shorter monitoring time periods;
at the monitoring time point, monitor reception of the information signal in the one or more shorter monitoring time periods,
wherein each of the one or more shorter monitoring time periods comprises a plurality of subintervals, and
wherein the first communications device being configured to monitor the reception of the information signal in the one or more shorter monitoring time periods comprises the first communications device being configured to:
monitor reception of the information signal within fewer than all of the subintervals of each shorter monitoring time period of the one or more shorter monitoring time periods,
wherein the configuration comprises a time offset and a time periodicity for the DRX cycle, and wherein the time offset indicates the starting time point of a first shorter monitoring time period of the one or more shorter monitoring time periods and the time periodicity indicates a time difference between the starting point of the first shorter monitoring time period and a starting time point of a second shorter monitoring time period of the one or more shorter monitoring time periods.

16. A nontransitory computer readable medium comprising instructions which, when executed on at least one processor, causes the at least one processor to carry out a method of a network node for configuring a first communications device to monitor reception of an information signal in monitoring time periods of different time durations, one monitoring time period being shorter than another, longer monitoring time period, wherein the information signal is repeatedly transmitted by a Radio Network Node, RNN, with a first periodicity during the longer monitoring time period and with a second periodicity during the shorter monitoring time period, the first periodicity being longer than the second periodicity, wherein the first communications device and the RNN operate in a wireless communications network, and wherein the method comprises:
determining that the first communications device is to be configured for monitoring reception of the information signal within one or more shorter monitoring time periods; and
configuring the first communications device with a Discontinuous Reception, DRX, cycle indicating a monitoring time point falling within the one or more shorter monitoring time periods,
wherein each of the one or more shorter monitoring time periods comprises a plurality of subintervals, and
wherein determining that the first communications device is to be configured for monitoring reception of the information signal within the one or more shorter monitoring time periods comprises:
determining that the first communications device is to be configured for monitoring reception of the information signal within fewer than all of the subintervals of each shorter monitoring time period,
wherein the configuring of the first communications device with the DRX cycle indicating the monitoring time point falling within the one or more shorter monitoring time periods comprises:
configuring the first communications device with a time offset and a time periodicity for the DRX cycle, wherein the time offset indicates a starting time point of a first shorter monitoring time period of the one or more shorter monitoring time periods and the time periodicity indicates a time difference between the starting time point of the first shorter monitoring time period and a starting time point of a subsequent second shorter monitoring time period of the one or more shorter monitoring time periods.

17. A nontransitory computer readable medium comprising instructions which, when executed on at least one processor, causes the at least one processor to carry out a method of a first communications device for monitoring reception of an information signal in monitoring time periods of different time durations, one monitoring time period being shorter than another, longer time period, wherein the information signal is repeatedly transmitted by a Radio Network Node, RNN, with a first periodicity during the longer time period and with a second periodicity during the shorter monitoring time period, the first periodicity being longer than the second periodicity, wherein the first communications device and the RNN operate in a wireless communications network, and wherein the method comprises:

receiving, from the RNN, a configuration configuring the first communications device with a Discontinuous Reception, DRX, cycle indicating a monitoring time point falling within one or more shorter monitoring time periods;

at the monitoring time point, monitoring reception of the information signal in the one or more shorter monitoring time periods, wherein each of the one or more shorter monitoring time periods comprises a plurality of subintervals, and wherein the monitoring of the reception of the information signal in the one or more shorter monitoring time periods comprises:

monitoring reception of the information signal within fewer than all of the subintervals of each shorter monitoring time period of the one or more shorter monitoring time periods, wherein the configuration comprises a time offset and a time periodicity for the DRX cycle, and wherein the time offset indicates the starting time point of a first shorter monitoring time period of the one or more shorter monitoring time periods and the time periodicity indicates a time difference between the starting point of the first shorter monitoring time period and a starting time point of a second shorter monitoring time period of the one or more shorter monitoring time periods.

\* \* \* \* \*